United States Patent [19]

Hoeschele

[11] 4,136,090

[45] Jan. 23, 1979

[54] STABILIZED COPOLYETHERESTER COMPOSITIONS

[75] Inventor: Guenther K. Hoeschele, Wilmington, Del.

[73] Assignee: E. I. Du Pont de Nemours and Company, Wilmington, Del.

[21] Appl. No.: 882,785

[22] Filed: Mar. 2, 1978

[51] Int. Cl.$^2$ .............................................. C08G 63/68
[52] U.S. Cl. ..................... 260/45.95 H; 260/45.8 NZ; 260/45.8 R; 260/45.95 R; 260/860; 528/289
[58] Field of Search .............. 260/75 N, 75 T, 45.8 R, 260/45.8 NZ, 45.95, 860

[56] References Cited

U.S. PATENT DOCUMENTS

| | | | |
|---|---|---|---|
| 3,763,109 | 10/1973 | Witsiepe | 260/75 R |
| 3,766,146 | 10/1973 | Witsiepe | 260/75 R |
| 3,974,127 | 8/1976 | Tanikella et al. | 260/75 N |

*Primary Examiner*—Lucille M. Phynes

[57] ABSTRACT

Copolyetheresters are stabilized against oxidative degradation due to exposure to heat and light by incorporating into the polymer effective concentrations of a phenolic antioxidant and copolymerized hindered amine photostabilizer units having the formula

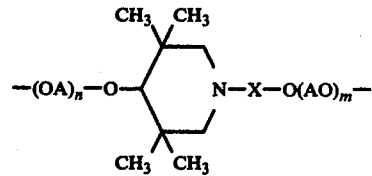

wherein A is ethylene and/or propylene, X is a divalent hydrocarbon radical of 2 to 18 carbon atoms and (n + m) equals 5 to 40, said photostabilizer units being connected to ester units in the copolyetherester through ester linkages.

16 Claims, No Drawings

STABILIZED COPOLYETHERESTER COMPOSITIONS

BACKGROUND OF THE INVENTION

Thermoplastic copolyetherester elastomers form a highly useful class of polymers because of their outstanding physical properties and excellent processing behavior. However, it is known that the copolyetheresters in contrast to polyesters are highly susceptible to oxidative degradation induced by exposure to heat or light. Thermally induced oxidative degradation is described in a paper by G. K. Hoeschele, Angewandte Makromolekulare Chemie, 58/59, pps. 299–319 (1977), which reports complete degradation of unstabilized copolyetheresters within 24 hours at 121° C. The rapidity of light induced oxidative degradation is evidenced by the complete failure of 0.25 mm films of copolyetheresters after about 6 weeks exposure indoors behind glass to northern sky light.

The classical solution to instability problems of the type exhibited by copolyetheresters has been to add a combination of an antioxidant and a UV-absorber. Such measures generally have been found to be adequate in related polymers such as polyether-based polyurethanes. In contrast to the polyurethanes, copolyetheresters respond to only a limited extent to the combination of antioxidant and UV-absorber. This contrasting behavior is further evidence of the unusual susceptibility of copolyetheresters to oxidative degradation.

Relatively recently, a new class of highly effective photostabilizers, characterized by the presence of hindered piperidine moieties, has become available. A number of such photostabilizers have been evaluated in copolyetheresters where their performance as photostabilizers is good. Japanese Patent Application Publication No. 75/91652 discloses the use of a number of hindered piperidine type photostabilizers in combination with phenolic antioxidants in copolyetheresters. It has been found that when one follows the teaching therein, photostabilization of the copolyetherester is indeed improved; however, heat-aging behavior is much poorer when the photostabilizer is present compared to performance in the absence of the photostabilizer. This deficiency cannot be corrected by simply increasing the concentration of phenolic antioxidant.

An additional problem encountered on many occasions is lack of compatibility of the photostabilizer at higher concentrations with the copolyetherester which results in migration of the photostabilizer to the surface of the polymer with the formation of bloom. Also, conventional photostabilizers can be extracted from or volatilized from the polymer in certain environments which reduces the stability of the substrate.

Thus, a need for copolyetherester compositions which simultaneously provide outstanding heat and light aging performance without the problems of prior art stabilizers still exists.

SUMMARY OF THE INVENTION

A novel copolyetherester composition containing a copolymerized hindered amine photostabilizer and a phenolic antioxidant has been discovered that has outstanding resistance to degradation due to heat and light aging. Moreover, blooming of the photostabilizer is not possible in this composition because the photostabilizer is chemically combined with the copolyetherester. More specifically, this invention is directed to a copolyetherester composition stabilized against oxidative degradation due to exposure to heat and light, said composition consisting essentially of a copolyetherester consisting essentially of a multiplicity of recurring long chain ester units and short chain ester units joined head-to-tail through ester linkages, said long chain ester units being represented by the formula

and said short chain ester units being represented by the formula

where G is a divalent radical remaining after the removal of terminal hydroxyl groups from a poly(alkylene oxide) glycol having a number average molecular weight of about 400–6000 and a carbon to oxygen atomic ratio of about 2.0–4.3; R is a divalent radical remaining after removal of carboxyl groups from an aromatic dicarboxylic acid having a molecular weight less than about 300, and D is a divalent radical remaining after removal of hydroxyl groups from a diol having a molecular weight less than about 250; said short chain ester units amount to about 15–95 percent by weight of said copolyetherester, and effective concentrations of a phenolic antioxidant and copolymerized hindered amine photostabilizer units having the formula

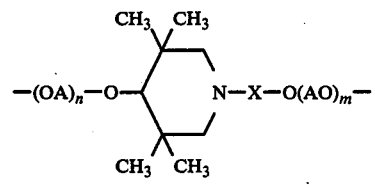

wherein A is ethylene and/or propylene, X is a divalent hydrocarbon radical of 2 to 18 carbon atoms and (n + m) equals 5 to 40, said photostabilizer units being connected to ester units in the copolyetherester through ester linkages.

Preferred stabilized copolyetherester compositions can be prepared by reacting said poly(alkylene oxide) glycol, said dicarboxylic acid and said diol in the presence of effective amounts of a phenolic antioxidant that is stable and substantially nonvolatile during polymerization and a copolymerizable hindered amine photostabilizer having the formula

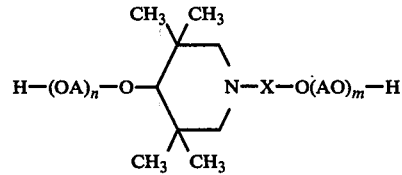

wherein A is ethylene and/or propylene, X is a divalent hydrocarbon radical of 2 to 18 carbon atoms and (n + m) equals 5 to 40. The compositions can also be prepared by addition of antioxidant to the copolyetherester after polymerization.

DETAILED DESCRIPTION OF THE INVENTION

The novel stabilized copolyetherester has incorporated therein effective amounts of a copolymerized hindered amine photostabilizer and a phenolic antioxidant. It is the combination of copolymerized hindered amine photostabilizer and phenolic antioxidant that results in a copolyetherester that shows excellent resistance to oxidative degradation caused by exposure to heat and light heretofore not exhibited by other copolyetheresters.

The term "long-chain ester units" as applied to units in a polymer chain of the copolyetherester that is stabilized refers to the reaction product of a long-chain glycol with a dicarboxylic acid. Such "long-chain ester units", which are a repeating unit in the copolyetheresters, correspond to formula (I) above. The long-chain glycols are polymeric glycols having terminal (or as nearly terminal as possible) hydroxy groups and a molecular weight from about 400–6000. The long-chain glycols used to prepare the copolyetheresters are poly-(alkylene oxide) glycols having a carbon-to-oxygen atomic ratio of about 2.0–4.3. Representative long-chain glycols are poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as ethylene oxide.

The term "short-chain ester units" as applied to units in a polymer chain of the copolyetherester that is stabilized refers to low molecular weight chain units having molecular weights less than about 550. They are made by reacting a low molecular weight diol (below about 250) with an aromatic dicarboxylic acid having a molecular weight below about 300, to form ester units represented by formula (II) above.

The term "low molecular weight diols" as used herein should be construed to include equivalent ester-forming derivatives, provided, however, that the molecular weight requirement pertains to the diol only and not to its derivatives.

Preferred are diols with 2–15 carbon atoms such as ethylene, propylene, tetramethylene, pentamethylene, 2,2-dimethyltrimethylene, hexamethylene, and decamethylene glycols, dihydroxycyclohexane, cyclohexane dimethanol.

The term "dicarboxylic acids" as used herein, includes equivalents of dicarboxylic acids having two functional groups which perform substantially like dicarboxylic acids in reaction with glycols and diols in forming copolyetherester polymers. These equivalents include esters and ester-forming derivatives, such as acid anhydrides. The molecular weight requirement pertains to the acid and not to its equivalent ester or ester-forming derivative.

Among the aromatic dicarboxylic acids for preparing the copolyetherester polymers that are stabilized, those with 8–16 carbon atoms are preferred, particularly the phenylene dicarboxylic acids, i.e., phthalic, terephthalic and isophthalic acids and their dimethyl esters.

The short-chain ester units will constitute about 15–95 weight percent of the copolyetherester. The remainder of the copolyetherester will be long-chain ester units comprising about 5–85 weight percent of the copolyetherester. These weight percent values are based only on the amounts of short-chain and long-chain ester units present in the polymer and do not include the copolymerized photostabilizer units.

Preferred copolyetheresters which are stabilized by the presence of the copolymerized photostabilizer and antioxidant are those prepared from dimethyl terephthalate, 1,4-butanediol, and poly(tetramethylene oxide) glycol having a molecular weight of about 600–2000. Optionally, up to about 30 mole % of the dimethyl terephthalate in these polymers can be replaced by dimethyl phthalate or dimethyl isophthalate.

The dicarboxylic acids or their derivatives, the polymeric glycol and the copolymerizable photostabilizer are incorporated into the copolyetherester in the same molar proportions as are present in the reaction mixture. The amount of low molecular weight diol actually incorporated corresponds to the difference between the moles of diacid and the sum of the moles of polymeric glycol and copolymerizable photostabilizer present in the reaction mixture. When mixtures of low molecular weight diols are employed, the amounts of each diol incorporated is largely a function of the amounts of the diols present, their boiling points, and relative reactivities. The total amount of diol incorporated is still the difference between moles of diacid and the sum of polymeric glycol and copolymerizable photostabilizer.

The copolyetheresters described herein are made by a conventional ester interchange reaction which, preferably, takes place in the presence of a phenolic antioxidant that is stable and substantially nonvolatile during the polymerization and a copolymerizable hindered amine photostabilizer.

A preferred procedure involves heating the dimethyl ester of terephthalic acid with a long-chain glycol and excess 1,4-butanediol in the presence of effective concentrations of a phenolic antioxidant, a copolymerizable hindered amine photostabilizer and a catalyst at about 150°–260° C. and a pressure of 50 to 500 Pa, preferably ambient pressure, while distilling off methanol formed by the ester interchange. Depending on temperature, catalyst, glycol excess and equipment, this reaction can be completed within a few minutes, e.g., about two minutes, to a few hours, e.g., about two hours. This procedure results in the preparation of a low molecular weight prepolymer which can be carried to a high molecular weight copolyetherester by distillation of the excess of short-chain diol. The second process stage is known as "polycondensation".

Additional ester interchange occurs during this polycondensation which serves to increase the molecular weight and to randomize the arrangement of the copolyetherester units. Best results are usually obtained if this final distillation or polycondensation is run at less than about 670 Pa, preferably less than about 250 Pa, and about 200°–280° C., preferably about 220°–260° C., for less than about two hours, e.g., about 0.5 to 1.5 hours. The preferred phenolic antioxidant and copolymerizable hindered amine photostabilizer can be introduced at any stage of copolyetherester formation, as long as polymerization is still in progress. Obviously, the antioxidant can be added after the polymer is prepared. As indicated above, preferably, the phenolic antioxidant and copolymerizable photostabilizer are added with the monomers. It is customary to employ a catalyst while carrying out ester interchange reactions. While a wide variety of catalysts can be employed, organic titanates such as tetrabutyl titanate used alone or in combination with magnesium or calcium acetates are preferred. The catalyst should be present in the amount of about 0.005 to 2.0 percent by weight based on total reactants.

Both batch and continuous methods can be used for any stage of copolyetherester polymer preparation. Polycondensation of prepolymer already containing the phenolic antioxidant and copolymerizable hindered amine photostabilizer can also be accomplished in the solid phase by heating divided solid prepolymer in a vacuum or in a stream of inert gas to remove liberated low molecular weight diol. This method has the advantage of reducing thermal degradation because it must be used at temperatures below the softening point of the prepolymer.

A detailed description of suitable copolyetheresters that can be stabilized by the phenolic antioxidant and copolymerizable hindered amine photostabilizer and procedures for their preparation are described in U.S. Pat. Nos. 3,023,192, 3,651,014, 3,763,109, and 3,766,146, the disclosures of which are incorporated herein by reference.

The copolyetherester is stabilized against oxidative degradation due to exposure to heat and light by incorporating in the polymer effective concentrations of a phenolic antioxidant and copolymerized hindered amine photostabilizer units. The hindered amine photostabilizer units that actually form a part of the polymer backbone have the formula

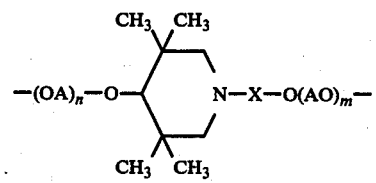

wherein A is ethylene and/or propylene, X is a divalent hydrocarbon radical, preferably aliphatic, of 2 to 18, preferably 2 to 3, carbon atoms, and (n + m) equals 5 to 40, preferably 10 to 30. As indicated above, the photostabilizer units are connected to ester units in the copolyetherester through ester linkages. Photostabilizer units wherein A and X are ethylene are especially preferred. Generally, up to 50 millimoles of copolymerized photostabilizer units are present per kilogram of copolyetherester, excluding the weight of the photostabilizer units. The particular amount incorporated in the composition depends on the degree of protection desired. Usually, amounts of copolymerized photostabilizer units incorporated in the copolyetherester are from about 2-20 millimoles per kilogram of copolyetherester.

The hindered amines used as copolymerizable photostabilizers for the copolyetheresters described herein are known compounds and are prepared, for example, by the base catalyzed reaction of alkylene oxide with a tetramethylpiperidine glycol having the formula

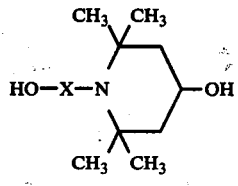

wherein X is a divalent hydrocarbon group having 2-18 carbon atoms. These tetramethylpiperidine alcohols substituted at the 1 position with an omega-hydroxy saturated aliphatic group are obtained by the uncatalyzed reaction of the corresponding secondary amine with an alkylene oxide or by reacting the secondary amine with a halogen-containing alkanol. These materials and their preparation are described in U.S. Pat. No. 3,974,127 to Tanikella et al.

As previously indicated, the present invention involves the use of an effective amount, e.g., usually up to 5% by weight of the copolyetherester, of a phenolic antioxidant in addition to the hindered amine photostabilizer. Usually, the amount of antioxidant added to and incorporated in the copolyetherester is from about 0.1-2% by weight of copolyetherester. The preferred phenolic antioxidants can be added with the monomers prior to the formation of the copolyetherester polymer or, if desired, the phenolic antioxidants can be added to the molten polymer after polymerization has been completed. Phenolic antioxidants which are too volatile or unstable for addition during the polymerization should be added to the finished polymer by melt blending. It is preferred to add the phenolic antioxidant with the monomers before polymerization begins.

Phenolic antioxidants are generally characterized by the presence of one or more radicals having the formula

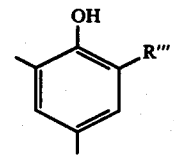

wherein R''' is a secondary or more preferably a tertiary alkyl group. Representative phenolic antioxidants include:

Monohydric phenols such as 2,6-di-tert-butyl-4-methyl-phenol, butylated p-phenyl-phenol and 2-(α-methylcyclohexyl)-4,6-dimethylphenol;

Bis-phenols such as 2,2'-methylenebis-(6-tertbutyl-4-methylphenol), 4,4'-bis(2,6-di-tert-butylphenol), 4,4'-methylenebis(6-tert-butyl-2-methylphenol), 4,4'-butylenebis(6-tert-butyl-3-methylphenol), 4,4'-methylenebis(2,6-di-tert-butylphenol), 4,4'-thiobis(6-tert-butyl-2-methylphenol), 2,2'-thiobis(4-methyl-6-tert-butylphenol), 1,6-hexamethylenebis(3,5-di-tert-butyl-4-hydroxyhydrocinnamate) and thiodiethylenebis(3,5-di-tert-butyl-4-hydroxyhydrocinnamate);

Poly-phenols such as 1,3,5-tris(3,5-di-tert-butyl-4-hydroxy hydrocinnamoyl)-hexahydro-s-triazine, 1,3,5-trimethyl-2,4,6-tris(3,5-di-tert-butyl-4-hydroxybenzyl) benzene, tri(3,5-di-tert-butyl-4-hydroxyphenyl) phosphite and tetrakis[methylene(3,5-di-tert-butyl-4-hydroxyhydrocinnamate)] methane; and Amide-containing phenolic antioxidants such as those described in U.S. Pat. No. 3,584,047. These materials are characterized by the presence of from 1 to 4 amide linkage-containing moieties having the following general structure:

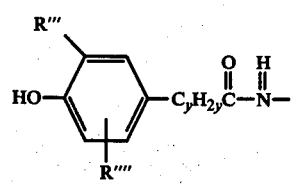

wherein R''' is secondary or tertiary alkyl, R'''' is hydrogen or alkyl, y is zero to six. Preferred antioxidants of this type are N,N'-hexamethylene bis(3,5-di-tert-butyl-4-hydroxyhydrocinnamamide) and N,N'-trimethylene bis(3,5-di-tert-butyl-4-hydroxyhydrocinnamamide).

Of the phenolic antioxidants, N,N'-hexamethylene bis(3,5-di-tert-butyl-4-hydroxyhydrocinnamamide) and N,N'-trimethylene bis(3,5-di-tert-butyl4-hydroxyhydrocinnamamide) are especially preferred. Mixtures of these two antioxidants can be used to advantage to minimize or eliminate blooming which may be encountered when only one stabilizer is used at the same level.

Properties of these copolyetherester compositions can be modified by incorporation of various conventional organic fillers, such as carbon black, silica gel, alumina, clays and chopped fiber glass. The incorporation of pigments in small amounts substantially improves the light stability of these compositions. Improvements in light stability can also be obtained by adding suitable UV-absorbers such as 2-(3',5'-di-tert-butyl-2'-hydroxyphenyl)-5-chlorobenzotriazole and 2(2'-hydroxy-5'-methylphenyl) benzotriazole. It is obvious that one can also add conventional hindered piperidine photostabilizers which are not copolymerizable, if desired.

The following ASTM methods are employed in determining the properties of the polymers prepared in the examples which follow:

| | |
|---|---|
| Modulus at 100% elongation,*$M_{100}$ | D 412 |
| Modulus at 300% elongation,*$M_{300}$ | D 412 |
| Modulus at 500% elongation,* $M_{500}$ | D 412 |
| Tensile at Break,*$T_B$ | D 412 |
| Elongation at Break,*$E_B$ | D 412 |
| Hardness, Shore D | D2240 |
| Heat Aging** | D 865 |
| Weather-Ometer Aging*** | D 750 |
| Melt Index**** | D 1238 |

*Cross-head speed 50.8 cm/min.
**All heat aging experiments were carried out with dumbbell shaped test specimens as described in ASTM D 412. The thickness of the test specimens is 0.9–1.0 mm.
***Dumbbells cut out from 0.25 mm thick films are used for Weather-Ometer aging.
****2160 g load, drying conditions: 1 hr. at 135° C/27 Pa.

The inherent viscosity is determined at a concentration of 0.1 g/dl in m-cresol at 30° C. and is expressed in dl/g.

For determination of the amino-N content, the copolyester is dissolved in m-cresol and titrated potentiometrically with a 0.01 n solution of 2,4-dinitrobenzene sulfonic acid in acetic acid.

The useful polymer life at the specified aging temperatures is determined by the 180° bend test. In this test the dumbbell-shaped test specimen as described in ASTM Method D 412, is removed from the heat aging tubes and kept at room temperature for about 10 minutes. Then the dumbbell is bent first in one direction until its ends touch each other and then bent in the opposite direction until the ends touch again. If the test specimen breaks during this procedure, it is said to have failed in the 180° bend test.

The following photostabilizers are used in the examples shown below:

| Designation | Chemical Composition |
|---|---|
| THP/20EO | reaction product of 1 mole of 2,2,6,6-tetramethyl-4-hydroxypiperidine (THP) with about 20 moles of ethylene oxide which is represented by the formula |

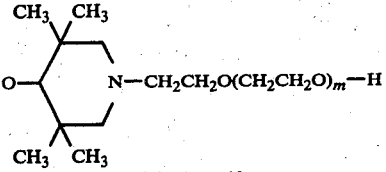

| Designation | Chemical Composition |
|---|---|
| THP/6EO | where (n + m) is about 19, reaction product of the THP (1 mole) with about 6 moles of ethylene oxide, which can be represented by the formula immediately above where (n + m) is about 5. |

For control purposes, bis(2,2,6,6,-tetramethyl-4-piperidinyl) sebacate - available from Ciba-Geigy Corp. as "Tinuvin" 770 - is used.

The following catalyst is used in preparing the copolyesters of the examples:

Catalyst

To 425 parts of anhydrous 1,4-butanediol in a round bottom flask is added 23.32 parts of tetrabutyl titanate. The mixture is agitated at 50° C. for 2–3 hours until the small amount of solids originally present disappears.

General Procedure for the Preparation of Copolyester A

The following materials are placed in an agitated flask fitted for distillation:

| | | |
|---|---|---|
| Poly(tetramethylene oxide) glycol number average molecular weight 991 | 20.18 | parts |
| Dimethyl terephthalate | 34.87 | parts |
| 1,4-Butanediol | 20.2 | parts |
| N,N'-Hexamethylene bis (3,5-di-tert-butyl-4-hydroxyhydrocinnamamide) | 0.15 (0.25%)* | parts |
| Catalyst | 1.4 | parts |

*Based on theoretical polymer yield

A stainless steel stirrer with a paddle cut to conform with the internal radius of the flask is positioned about 3 mm from the bottom of the flask and agitation is started. The flask is placed in an oil bath at 160° C., agitated for five minutes and then the catalyst is added. Methanol distills from the reaction mixture as the temperature is slowly raised to 250° C. over a period of one hour. When the temperature reaches 250° C., the pressure is gradually reduced to <135 Pa within 20 minutes. The polymerization mass is agitated at 250° C./<135 Pa for 44 minutes. Then the polycondensation polymerization is discontinued by releasing the vacuum under nitrogen and the resulting viscous molten product is scraped from the flask in a nitrogen (water and oxygen-free) atmosphere and allowed to cool. The resulting polymer has an inherent viscosity of 1.3–1.4 dl/g and a melt index of 5–12 g/10 min. (measured at 220° C.). After shredding the polymer is extruded at 220° C. to a 3–4 mm strand and granulated.

GENERAL PROCEDURE FOR THE PREPARATION OF COPOLYESTER B

In an agitated flask fitted with a distillation column 25.0 parts of ethylene glycol, 37.3 parts of dimethyl terephthalate and 0.15 parts of N,N'-hexamethylene bis(3,5-di-tert-butyl-4-hydroxyhydrocinnamamide) and 1.4 parts catalyst are agitated and heated at such a rate that the temperature at the head of the distillation column is maintained at 70° C. while methanol is removed. When substantially all of the methanol is distilled out of the reaction mixture, the head temperature rises abruptly to about 180° C. Heating and distillation continues until the temperature in the reactor reaches 230° C. The reaction mixture is allowed to cool to 185° C. and 22.3 parts of poly(tetramethylene oxde) glycol having a number average molecular weight of 991 is added. The reaction flask is then immersed in a 250° C. oil bath and the mixture agitated for 5 minutes under nitrogen. While maintaining an oil bath temperature of 250° C., the pressure is step-wise reduced to 25–65 Pa and the distillate consisting essentially of ethylene glycol collected in a cold trap. After stirring for about 60 minutes, the copolyester is isolated as described above for Copolyester A. The resulting polymer has an inherent viscosity of about 1.30 dl/g and a Shore D hardness of 55.

EXAMPLE 1

The procedure described above for the preparation of Copolyester A is repeated with the exception that polymerization is conducted in the presence of 0.6 part of photostabilizer THP/20EO as additional starting material. Resulting Polymer A has an inherent viscosity of 1.4 dl/g, a melt index of 8.3 g/10 min. (measured at 220° C.) and an amino-N content of 0.013% which corresponds to 9.6 millimole [THP/20EO]/kg copolyester. The resulting photostabilizer units are connected to ester units in the copolyetherester through ester linkages.

CONTROL POLYMERS

The procedure described above for the preparation of Copolyester A is repeated. The resulting copolyester has an inherent viscosity of 1.35 dl/g and a melt index of 7.7 g/10 min. at 220° C. The copolyester is shredded and blended for several hours by rolling first with 0.05% Sandozin D 100 — a liquid non-ionic alkyl phenol polyether wetting agent available from Sandoz Inc., Hanover, N.J. — and then with 0.27% of finely powderized bis(2,2,6,6-tetramethyl-4-piperidinyl) sebacate. Finally, the dry blend is mixed in a single screw extruder at 220°–230° C. The resulting Control Polymer B has an amino-N content of 0.016%.

Control Polymer C is prepared by repeating the procedure described above in Example 1 for the preparation of Polymer A except that N,N'-hexamethylene bis(3,5-di-tert-butyl-4-hydroxyhydrocinnamamide) is omitted from the formulation.

Control Polymer D is prepared according to the procedure described above for the preparation of Copolyester A. Thus, it contains as the only stabilizer 0.25% N,N'-hexamethylene bis(3,5-di-tert-butyl-4-hydroxyhydrocinnamamide) and no photostabilizer.

For Weather-Ometer (WOM) aging tests 0.25 mm thick films are compression molded at 215° C., for heat aging experiments 1.0 mm slabs are prepared at the same temperature. The physical properties of all four compositions before and after aging are shown in Table I.

TABLE I

| Original Properties | Polymer A | | Control Polymer B | | Control Polymer C | | Control Polymer D | |
|---|---|---|---|---|---|---|---|---|
| $M_{100}$, MPa | 16.5 | | 17.0 | | 16.8 | | 17.4 | |
| $M_{300}$, MPa | 17.9 | | 18.5 | | 18.2 | | 18.6 | |
| $T_B$, MPa | 42.7 | | 42.0 | | 43.2 | | 35.9 | |
| $E_B$, % | 650 | | 680 | | 700 | | 750 | |
| Shore D hardness | 55 | | 55 | | 55 | | 55 | |
| Properties after WOM | $T_B$ | $E_B$ | $T_B$ | $E_B$ | $T_B$ | $E_B$ | $T_B$ | $E_B$ |
| Aging (0.25 mm thick) | MPA | % | MPA | % | MPA | % | MPA | % |
| 40 hrs. | 23.1 | 410 | 25.6 | 430 | 15.8 | 40 | completely degraded | |
| 60 hrs. | 19.6 | 100 | 17.2 | 90 | 19.3 | 30 | — | |
| 100 hrs. | 18.6 | 30 | 17.9 | 20 | 17.1 | 10 | — | |
| Properties After Heat Aging at 121° C (1 mm slabs) | | | | | | | | |
| 1 day | — | — | — | — | F* | | — | |
| 1 week | 42.7 | 630 | 7.3 | 10 | — | | — | |
| 2 weeks | 36.5 | 730 | F* | | — | | 36.2 | 620 |
| 3 weeks | 37.2 | 750 | — | | — | | 33.4 | 640 |
| 5 weeks | F* | | — | | — | | 30.3 | 600 |
| 7 weeks | — | | — | | — | | F* | |

*Failure in 180° bend test

It is evident from the experimental data that only Polymer A exhibits a combination of good weatherability and heat aging resistance. Control Polymers B and C are greatly deficient in respect to heat aging, while Control Polymer D is readily degraded when exposed to light.

When the above photostabilizer is incorporated by copolymerization into Copolyester B at the same concentration as given in Example 1, similar test results are obtained in respect to weathering and heat aging.

EXAMPLE 2

The procedure described above for the preparation of Copolyester A is repeated except that polymerization is conducted in the presence of 0.23 parts of THP/6EO* as additional starting material. The physical properties of the resulting polymer after Weather-Ometer (WOM) aging and heat aging are shown in Table II.
* 10.2 millimole/kg copolyester

TABLE II

| Properties After WOM Aging (0.25 mm thick) | $T_B$ MPA | $E_B$ % |
|---|---|---|
| 60 hrs. | 17.6 | 250 |
| 100 hrs. | 18.6 | 30 |
| 150 hrs. | 17.9 | 20 |
| Properties After Heat Aging at 121° C (1 mm thick) | | |
| 2 weeks | 38.6 | 700 |
| 4 weeks | 27.6 | 560 |
| 5 weeks | F** | |

*10.2 millimole/kg copolyester
**Failure in 180° bend test

EXAMPLE 3

The procedure for the preparation of Polymer A of Example 1 is substantially repeated except 0.15 parts N,N'-trimethylene bis(3,5-di-tert-butyl-4-hydroxyhydrocinnamamide) as additional phenolic antioxidant is used. The resulting copolyester composition is non-blooming and exhibits a superior balance of weathering and heat aging characteristics as shown in Table III.

TABLE III

| Original Properties | | |
|---|---|---|
| $M_{100}$, MPa | 16.7 | |
| $M_{300}$, MPa | 17.8 | |
| $T_B$, MPa | 40.9 | |
| $E_B$, % | 630 | |
| Properties After WOM | | |
| Aging (0.25 mm thick) | $T_B$, MPA | $E_B$, % |
| 60 hrs. | 25.3 | 250 |
| 80 hrs. | 19.0 | 60 |
| 100 hrs. | 18.7 | 35 |
| 150 hrs. | 18.2 | 25 |
| Properties After Heat | | |
| Aging at 121° C (1 mm thick) | | |
| 4 weeks | 27.6 | 650 |
| 5 weeks | 27.0 | 640 |
| 6 weeks | 26.8 | 600 |
| 8 weeks | F* | |

*Failure in 180° bend test

EXAMPLE 4

The procedure described above for the preparation of Polymer A of Example 1 is substantially repeated except that polymerization is conducted in the presence of 1.04 parts THP/20EO which is incorporated in the backbone of Polymer 4A and 0.3 part THP/6EO which is incorporated in the backbone of Polymer 4B. The weathering and heat aging characteristics of both compositions are shown in Table IV.

TABLE IV

| Percent Retention of Elongation at Break ($E_B$) After WOM Aging* (0.25 mm thick) | Polymer 4A** | Polymer 4B*** |
|---|---|---|
| 40 hrs. | 67 | 64 |
| 60 hrs. | 30 | 7.7 |
| 80 hrs. | 6.1 | 6.1 |
| 100 hrs. | 6.1 | 1.5 |
| Polymer life at 121° C**** (weeks) | 4 | 5 |

*The level of photostabilization is indicated by the degree of retention of the elongation at break ($E_B$) as a function of the aging time. A retention of >5% of the original $E_B$-value (ca. 650%) is considered necessary for useful polymer properties.
**16.5 millimole photostabilizer/kg copolyester
***4.75 millimole photostabilizer/kg copolyester
****Determined by 180° bend test.

I claim:

1. A copolyetherester composition stabilized against oxidative degradation due to exposure to heat and light, said composition consisting essentially of a copolyetherester consisting essentially of a multiplicity of recurring long chain ester units and short chain ester units joined head-to-tail through ester linkages, said long chain ester units being represented by the formula

and said short chain ester units being represented by the formula

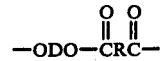

where G is a divalent radical remaining after the removal of terminal hydroxyl groups from a poly(alkylene oxide) glycol having a number average molecular weight of about 400–6000 and a carbon to oxygen atomic ratio of about 2.0–4.3; R is a divalent radical remaining after removal of carboxyl groups from an aromatic dicarboxylic acid having a molecular weight less than about 300, and D is a divalent radical remaining after removal of hydroxyl groups from a diol having a molecular weight less than about 250; said short chain ester units amount to about 15–95% by weight of said copolyetherester and effective concentrations of a phenolic antioxidant and copolymerized hindered amine photostabilizer units having the formula

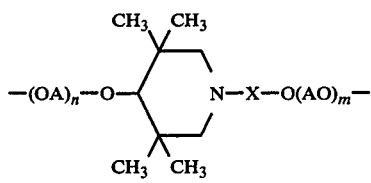

wherein A is ethylene and/or propylene, X is a divalent hydrocarbon radical of 2 to 18 carbon atoms and (n + m) equals 5 to 40, said photostabilizer units being connected to ester units in the copolyetherester through ester linkages.

2. A composition of claim 1 wherein X is 2 or 3 carbon atoms.

3. A composition of claim 1 wherein A is ethylene.

4. A composition of claim 1 wherein (n + m) equals 10 to 30.

5. A composition of claim 1 wherein the phenolic antioxidant is N,N'-hexamethylene bis(3,5-di-tert-butyl-4-hydroxyhydrocinnamamide, N,N'-trimethylene bis(3,5-di-tert-butyl-4-hydroxyhydrocinnamamide) or mixtures thereof.

6. A composition of claim 1 wherein the copolymerized photostabilizer units have the formula

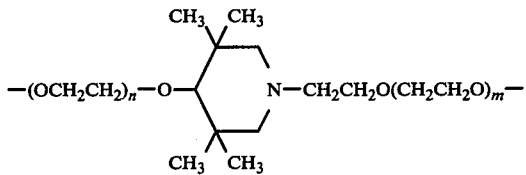

where (n + m) equals 10 to 30.

7. A composition of claim 1 containing up to 50 millimoles of copolymerized photostabilizer units per kilogram of copolyetherester.

8. A composition of claim 1 containing about 2-20 millimoles of copolymerized photostabilizer units per kilogram of copolyetherester.

9. A composition of claim 1 containing up to 5% by weight of the copolyetherester of a phenolic antioxidant.

10. A composition of claim 1 containing about 0.1-2% by weight of the copolyetherester of a phenolic antioxidant.

11. A process for producing the stabilized copolyetherester composition of claim 1 which comprises reacting said poly(alkylene oxide) glycol, said dicarboxylic acid and said diol in the presence of effective amounts of a phenolic antioxidant that is stable and substantially nonvolatile during polymerization and a copolymerizable hindered amine photostabilizer having the formula

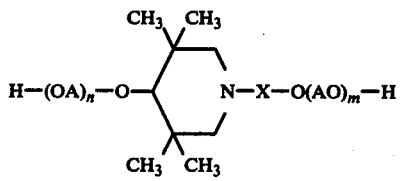

wherein A is ethylene and/or propylene, X is a divalent hydrocarbon radical of 2 to 18 carbon atoms, and (n + m) equals 5 to 40.

12. A process of claim 11 wherein X is 2 or 3 carbon atoms.

13. A process of claim 11 wherein A is ethylene.

14. A process of claim 11 wherein (n + m) equals 10 to 30.

15. A process of claim 11 wherein the phenolic antioxidant is N,N'-hexamethylene bis(3,5-di-tert-butyl-4-hydroxyhydrocinnamamide), N,N'-trimethylene-bis-(3,5-di-tert-butyl-4-hydroxyhydrocinnamamide) or mixtures thereof.

16. A process of claim 11 wherein the copolymerizable photostabilizer has the formula

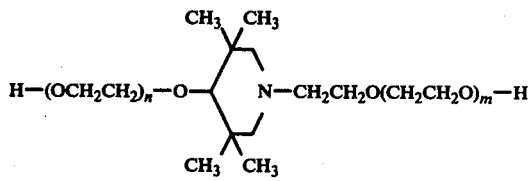

where (n + m) equals 10 to 30.

* * * * *

UNITED STATES PATENT OFFICE
CERTIFICATE OF CORRECTION

PATENT NO. : 4,136,090
DATED : January 23, 1979
INVENTOR(S) : Guenther K. Hoeschele It is certified that error appears in the above-identified patent and that said Letters Patent are hereby corrected as shown below:

In the Abstract, lines 7-13;
Column 2, lines 34-41 and lines 56-62;
Column 5, lines 28-34;
Column 8, lines 4-9;
Claim 1, column 12, lines 20-27;
Claim 6, column 12, lines 47-54;
Claim 11, column 13, lines 10-19; and
Claim 16, column 14, lines 13-20, That portion of the formula reading

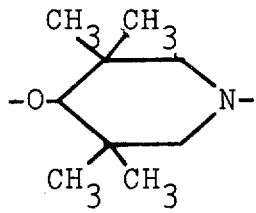   should read   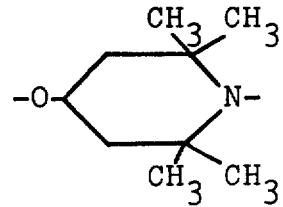

Signed and Sealed this

Fifteenth Day of July 1980

[SEAL]

Attest:

SIDNEY A. DIAMOND

Attesting Officer    Commissioner of Patents and Trademarks